Figure 1:
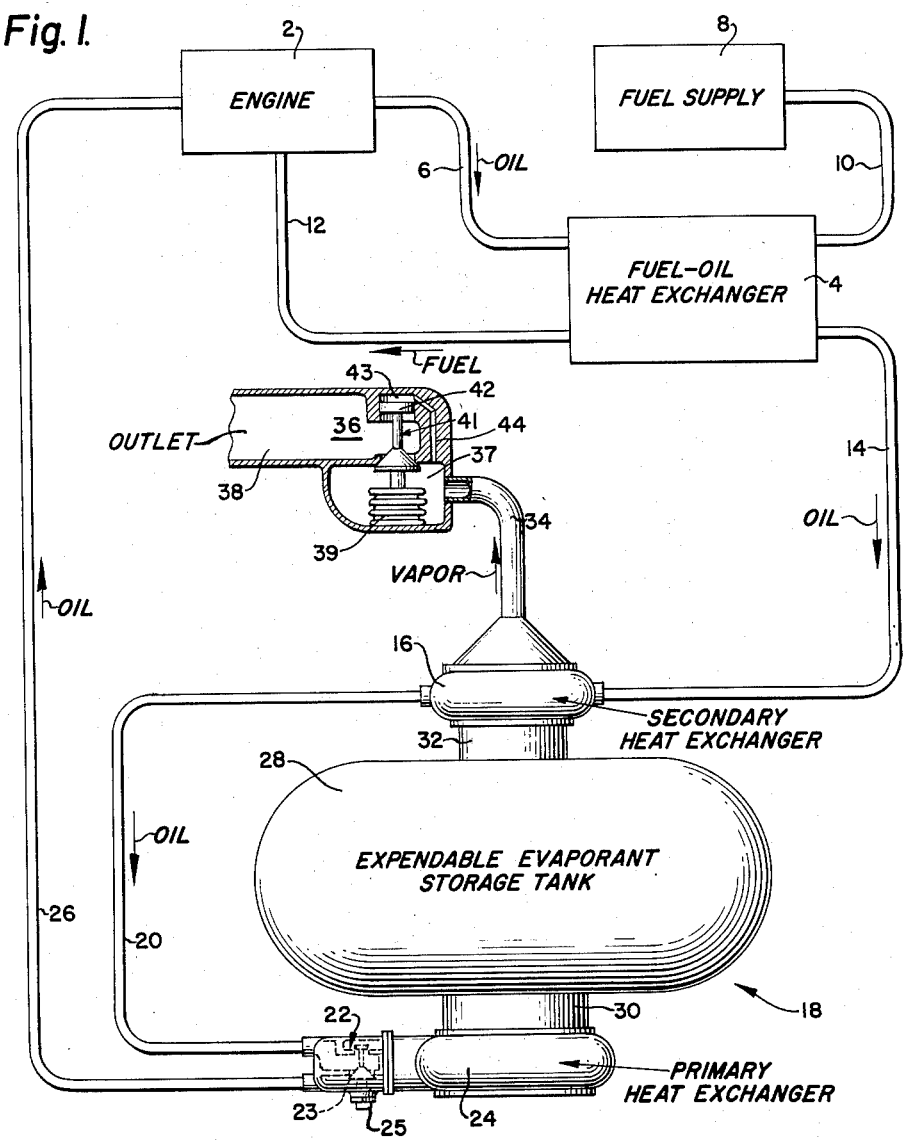

Sept. 26, 1961     J. FUKUZAWA ET AL     3,001,379
HEAT TRANSFER SYSTEM
Filed Jan. 26, 1959

INVENTORS:
JUN FUKUZAWA,
WILLIAM J. O'REILLY,
BY

Attorney.

3,001,379
HEAT TRANSFER SYSTEM
Jun Fukuzawa, Monterey Park, and William J. O'Reilly, Los Angeles, Calif., assignors to The Garrett Corporation, Los Angeles, Calif., a corporation of California
Filed Jan. 26, 1959, Ser. No. 788,867
6 Claims. (Cl. 62—196)

The present invention relates to heat transfer systems and more particularly to heat transfer systems for fluid cooling.

A common cooling sytem for aircraft engines is a cooling system of the ram air type. In this system of cooling, ambient air is introduced into a heat exchanger which is connected to an aircraft engine lubricating oil supply. The engine lubricating oil is cooled in passing through coils or passes of the heat exchanger which are in the path of flow of the air introduced into the exchanger. This system of cooling is very effective under many conditions but it has been found to be inadequate or entirely ineffective for cooling the engine oil of aircraft operating at high speeds where the temperature of the air introduced into the exchanger and heated by ram compression may exceed maximum engine oil temperatures.

Another cooling system which has performed satisfactorily in aircraft is a system employing a fuel-to-oil heat exchanger in which heat is transferred from the oil to the fuel. In this system, the fuel supplied to the engine of the aircraft is passed through the heat exchanger. The difficulty in this latter system is that its cooling capacity is limited by the quantity of fuel consumed by the engine. Although the oil-to-fuel heat exchanger may be adequate for many flight conditions, its cooling capacity is often inadequate for high altitude flights where the quantity of fuel consumed is less than at lower altitudes.

In view of the limitations of the foregoing systems, other or supplementary engine oil cooling is required for high speed or high altitude flight. Despite the disadvantage of the additional weight involved, a cooling system employing an expendable evaporant for heat absorption in the primary heat exchanger of a supplementary cooling system has considerable merit and appears to be the most advantageous. The most common evaporant employed in a system of this type is water and its use in the system has been described in the detailed description infra; however, any substance having good heat absorption characteristics, particularly during a change in state, could be used.

In order to minimize the added weight necessary in an expendable evaporant cooling system while increasing the heat transfer potential, the present invention provides a secondary heat exchanger which is connected in the discharge path of the evaporant and in the path of flow of the engine oil through the system. In the preferred arrangement, the evaporant cooling medium absorbs heat during a change in state in the primary heat exchanger. Subsequently, the vapor is used in a secondary heat exchanger to absorb heat from the oil as it passes through the supplementary cooling system. The heat transferred to the vapor in the secondary heat exchanger reduces the heat extraction load in the primary heat exchanger to lower the engine oil temperatures, thereby reducing the evaporant consumption.

Another advantage of the preferred embodiment of the invention is that the structure of the secondary heat exchanger, which is positioned in the discharge path of the evaporant, serves as a baffle thereby reducing the loss of evaporant due to spilling; e.g., spilling of water from the storage tank through the discharge duct as a result of water turbulence occasioned by boiling under high heat loads and by changes of aircraft speed, direction or attitude.

Additional means have been provided in the preferred embodiment of the invention for controlling the vapor pressure of the evaporant cooling system. The simplest form of pressure control, e.g., a pressure relief valve, can be used to increase the vapor pressure in the system whereby the variations in boiling or saturation temperature with changes in aircraft altitude will be substantially lessened. Without pressure controls, an evaporant supply carried aboard an aircraft will, in many instances, be subjected to environment heat transfer at certain altitudes where lower saturation temperatures cause losses in the evaporant when ambient temperatures exceed the saturation temperature. Environmental temperatures of approximately 200° F., for example, at altitudes having pressures producing boiling of water at 80° F., are not uncommon.

A further advantage of pressure control in an evaporative cooling system for aircraft includes substantial reduction in the evaporant volumetric flow rate; for example, if water is the evaporant, a volumetric flow rate of 15–20 cu. ft. of vapor per sec. at altitudes between 60,000 and 66,000 feet can be reduced to 1.2 cu. ft. per sec. by operating at a vapor pressure of approximately 14 p.s.i. rather than at the ambient pressure corresponding to the 60,000 ft. altitude. Another advantage of operating at higher than ambient atmospheric pressure particularly at higher altitudes, is the decrease in turbulence in boiling resulting from decreased volumetric vapor production rate thereby decreasing losses in evaporant due to splashing and spilling out the discharge duct. Also, in cases where a sufficient temperature potential is available, it has been found that evaporative heat transfer efficiencies can be increased by operating at pressures above ambient pressures, thereby decreasing the size and weight of the evaporator.

It is an object therefore, to provide a heat transfer system having the foregoing features and advantages.

Another object of the present invention is the provision of a fluid cooling system providing secondary heat transfer to a substance capable of absorbing heat during a change in state.

A further object is to provide a fluid cooling system employing a substance capable of absorbing heat during a change in state and having a secondary cooling means in the discharge path of the substance to provide for a secondary heat transfer after the change in state of the substance.

Still another object of the invention is the provision of a fluid cooling system including an expendable substance for absorbing heat during a change in state and secondary heat transfer means in the discharge path of flow of the substance.

Another object is to provide a fluid cooling system in which the introduction of fluid into the heat transfer means is regulated.

A further object of the invention is the provision of an expendable evaporant fluid cooling system having a primary heat transfer means employing an expendable evaporant which is vaporized in the heat transfer process, and a secondary cooling means disposed in a discharge path for the vapor for secondary heat transfer to increase the heat transfer potential of the system.

Still another object is to provide an expendable evaporant fluid cooling system in which a secondary heat transfer means is located in the discharge path of the vaporized liquid evaporant, wherein the secondary heat transfer means physically obstructs the discharge path to lessen the loss of liquid due to splashing and spilling.

Another object of the invention is the provision of an expendable evaporant engine oil cooling system for aircraft in which a secondary heat transfer means is located in a discharge path of a primary evaporative heat transfer means.

A further object is to provide an expendable evaporant engine oil cooling system for aircraft in which the discharge path from the evaporant heat transfer means includes a pressure control arrangement for regulating the pressure of the vapor in the system.

Still another object of the invention is the provision of an expendable evaporant cooling system which is operated under regulated vapor pressures.

Figure 2:
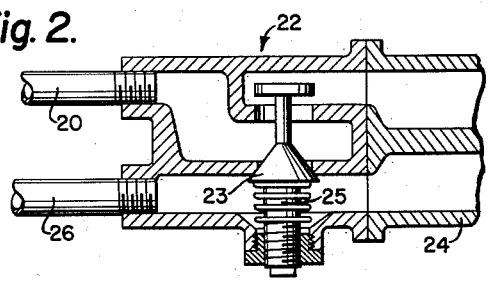
Figure 2:

Other objects and features of the invention will become apparent to those skilled in the art as the disclosure is made in the following detailed description of a preferred embodiment of the invention as illustrated in the accompanying drawing in which:

Referring now to the drawing, FIG. 1 is a schematic diagram illustrating a fluid cooling system for aircraft or spacecraft in which certain portions have been shown in section; and FIG. 2 is a sectional view of the thermostatic control valve shown in FIG. 1.

In the preferred embodiment illustrated, an engine 2 includes a supply of engine lubricating oil which requires cooling during the engine operation. The engine is shown connected to an oil-to-fuel heat exchanger 4 by a conduit or oil line 6. The cooling capacity of the oil-to-fuel heat exchanger is limited by the quantity of fuel passing through the heat exchanger to the engine. A fuel supply 8 supplying relatively cold fuel to the exchanger is connected thereto by a fuel line 10. In the oil-to-fuel heat exchanger, the heat in the oil from the engine is transferred to the fuel passing through the heat exchanger in its path of flow to the engine through a fuel line 12.

Since, in many instances, the oil-to-fuel heat transfer is inadequate for all conditions of flight of the aircraft, particularly for high speed, high altitude flight when the cooling capacity of the oil-to-fuel heat exchanger is greatly reduced because of reduced fuel consumption, the oil in the flow path of the cooling system is supplied to a supplementary engine oil cooling system 18 of the expendable evaporant type. The engine oil therefore, is passed on from the oil-to-fuel heat exchanger to a supplementary system through an oil line 14 connected into a secondary heat exchanger 16. The engine oil is passed through the secondary heat exchanger 16 and an oil line 20 to a primary heat exchanger or boiler 24. If the temperature of the oil exceeds a preselected limit, e.g., a preselected maximum temperature for oil in the engine, a thermostatic oil control valve 22 admits some or all of the oil into the boiler for cooling. In the preferred arrangement, a balanced valve element 23 is controlled by a thermostatic element 25. The position of valve element 23, controlled by the thermostatic element, regulates the flow of oil to the boiler. Unless the engine oil passing the thermostatic element exceeds a preselected maximum engine oil temperature the oil bypasses the boiler through the lower valve port of the control valve. When the engine oil passing the thermostatic elements exceeds the preselected maximum oil temperature, the movable valve element is actuated and the upper valve port is opened to admit oil into the boiler. Preferably, the thermostatic element is located in the control valve outlet. In this manner, the temperature of the oil being returned to the engine is sensed to control the cooling in the primary heat exchanger. The type of thermostatic unit illustrated and described herein is for exemplification only, as other types of thermostatic means, well known in the art, may be utilized for controlling the position of valve element 23 so as to regulate the flow of oil to the boiler.

The expendable evaporant supplementary fluid cooling system 18 includes, in addition to the primary heat exchanger 24 and the secondary heat exchanger 16, a storage tank 28 containing an expendable substance or evaporant which is supplied to the boiler through a path of flow including a conduit 30 where the evaporant surrounds the plates or tubing in the boiler. Preferably, the evaporant is water which is vaporized during the heat transfer process. The vapor is passed to a vapor outlet through a discharge path including a conduit 32 connecting the storage tank 28 to the secondary heat exchanger or superheater 16. A conduit 34 passes the superheated vapor from the superheater to an absolute pressure regulator 36 disposed in part in a chamber 37 and projecting into the adjacent portion of an overboard discharge duct 38. The absolute pressure regulator 36 is connected to an outlet or discharge port by the overboard discharge duct where the vapor is vented to the atmosphere.

Although any type of back pressure control valve may be utilized to maintain a back pressure in the expendable evaporant fluid cooling system, an absolute pressure regulator provides for optimum performance by accurately controlling the temperature gradient between the evaporant and the wall of the heat exchanger tubing which separates the oil from the evaporant in the boiler 24. Preferably, a pressure is maintained in the syetem 18 which controls the saturation temperature of the evaporant whereby the temperature gradient of the evaporant and heat exchanger wall is maintained within a preselected range which provides the most efficient heat transfer, i.e., range of stable boiling commonly referred to as "nucleate boiling." This involves only the maintenance of the saturation temperature at a reasonably high level whereby the difference in oil temperature entering the boiler and the saturation or boiling temperature of the evaporant is not excessive, and the temperature gradient in the heat exchanger is maintained at a satisfactory low level.

The absolute pressure regulator, which has been illustrated schematically in the drawing, is shown to include a pressure sensitive bellows 39 which is subjected to vapor pressure in the evaporant cooling system conduit 34. As the vapor pressure in the chamber 37 exceeds a preselected absolute pressure, the bellows actuates a movable valve poppet 41 permitting the escape of vapor through a valve port into the discharge duct 38. The valve structure provides for balanced operation by the inclusion of a balancing piston 42 which is connected to the valve poppet so as to operate rectilinearly along with the poppet in a cylinder 43. The cylinder has an open end opposite the poppet for receiving the balancing piston. A passage 44 leading from the chamber 37 opens into the cylinder to admit the same pressure to the cylinder as is in the chamber, whereby the vapor pressure acting on the piston and poppet produces equal and opposite forces balancing the poppet for uniform operation in response to actuation by the bellows 39. Thus, the absolute pressure of the evaporant cooling system is regulated to the preselected pressure for producing optimum performance.

In operation, the engine oil which is heated during engine operation, is circulated through the series of heat exchangers including the oil-to-fuel heat exchanger. Since the oil-to-fuel heat exchanger is often inadequate, the engine oil is passed on to the supplementary cooling system 18 by the conduit 14. If the engine oil flowing through the supplementary cooling system exceeds a predetermined temperature, at least a portion of the oil is passed through the boiler 24. Vaporization of the evaporant flowing into the boiler from the storage tank absorbs a large quantity of heat from the oil in the heat transfer process where the cooling capacity depends upon the heat of vaporization and quantity of the evaporant.

The maximum efficiency of the boiler is obtained when the maximum heat transfer is produced between the heat transfer coils or plates of the boiler and the surrounding evaporant. In cooling engine oils heated during high speed, high altitude flight, maximum heat transfer can be obtained by regulating the saturation temperature or boiling point of the evaporant by controlling the pressure of the evaporant. Controlling or regulating the pressure produces higher saturation temperatures than normally encountered at high altitudes, whereby the temperature differential between the oil and evaporant is less than it would be without restricting the release of vapor. The maximum heat transfer is a direct consequence of regulating the temperature differential between oil and evaporant to a predetermined maximum whereby the temperature gradient of the wall separating the evaporant and the oil is regulated to a predetermined desired amount less than the temperature gradient produced in the absence of pressure regulation.

The pressure regulation decreases the turbulence of the evaporant during boiling as a direct consequence of decreasing the volumetric flow of the vapor. The vapors from the expendable evaporant, produced during the change in state of the evaporant as a result of the heat transfer in the boiler, are conducted to the outlet through a discharge path including a secondary heat exchanger or superheater. The vapors from the evaporant passing the coils or plates absorb heat from the oil in the ordinary process of heat transfer. After the vapors are superheated in the secondary heat exchanger 16, they are passed through the absolute pressure regulator 36 to the overboard discharge duct. The duct is constructed much larger than the conduit 34 in order to accommodate the increased volumetric flow.

As would be apparent from the consideration of the system, an alternate arrangement producing a more efficient heat transfer can be provided in the secondary heat exchanger 16 by locating the absolute pressure regulator between the primary and secondary heat exchangers 24 and 16 whereby the vapor is cooled during the expansion occurring in the absolute pressure regulator 36. However, the preferred arrangement shown has been selected since the exchanger 16 would be separated from the exchanger 24 to minimize the need for larger ducting required after expansion due to the increased volumetric flow rate. If, however, the larger ducting which would be required can be tolerated, the evaporant fluid cooling system 18 including the primary and secondary heat exchangers 24 and 16 may be retained as a unit while employing a larger ducting throughout the discharge path. In the alternate arrangement, increased volumetric flow of the expanded steam or vaporized evaporant, introduces the need for a larger secondary heat exchanger 16 to accommodate the increased volumetric vapor flow.

In order to conserve the evaporant, thereby improving the overall operation of the system, a thermostatic control valve 22 has been provided to bypass the engine oil past the boiler when supplementary cooling by the evaporant cooling system is unnecessary. Generally, cooling by the expendable evaporant cooling system is determined to be unnecessary when the temperature of the engine oil flowing through the thermostatic control valve is below a temperature which has been predetermined as a maximum permissible engine oil temperature for satisfactory lubrication or otherwise does not cause deterioration of the engine oil itself or parts to be lubricated. Preferably, the thermostatic oil control valve regulates the flow of oil into the boiler as a function of oil temperatures whereby all or some of the oil flowing through the cooling system which exceeds a preselected temperature as detected by the thermostatic control valve is passed into the boiler of the evaporant cooling system. As a result of the cooling, engine oils having temperatures exceeding the preselected temperature at the inlet to the thermostatic control valve will be lowered below this temperature when passing through the outlet of the valve to be returned to the engine through the return oil line 26.

As noted previously, the evaporant in the storage tank 28 is vaporized in the heat transfer process. Boiling of the evaporant in the storage tank is often turbulent in its action and causes splashing to such degree that the evaporant in liquid form could if not restricted escape along with the vapor through the discharge duct. Also splashing or sloshing caused by maneuvers of the aircraft could, if not restricted or suppressed, result in the escape of the liquid along with the vapors in the discharge duct. Splashing resulting in an escape of the evaporant in liquid form can occur despite baffles and other means employed in the storage tank 28 to prevent excessive movement, i.e., sloshing of the evaporant in liquid form. Both the secondary heat exchanger 16 and the absolute pressure regulator 36 restrict the flow of liquid evaporant to the discharge duct 38 to minimize liquid evaporant loss due to splashing and sloshing.

In the light of the above teachings, various modifications and variations of the present invention are contemplated and will be evident to those skilled in the art without departing from the spirit and scope of the invention.

We claim:

1. An expendable evaporant engine oil cooling system for aircraft of the type described comprising; means establishing a path of flow of the engine oil from the engine and back thereto, primary evaporative oil cooling means in said path for vaporizing the evaporant in a heat transfer operation with the oil, secondary oil cooling means connected prior to and in series with said primary oil cooling means in said path, and means establishing a discharge path of flow for said evaporant vapor from the primary cooling means through the secondary cooling means whereby heat from the oil is absorbed in the secondary cooling means in superheating the evaporant vapor.

2. An expendable water evaporant engine oil cooling system for aircraft comprising; means establishing a path of flow of said engine oil from the engine and back thereto, primary evaporative cooling means in said path vaporizing the water in a heat transfer operation with said oil, secondary cooling means coupled prior to and in series with said primary cooling means in said path, and means establishing a discharge path of flow for said water vapor from the primary cooling means through the secondary cooling means whereby a heat transfer is provided in the secondary cooling means superheating the water vapor.

3. An expendable evaporant engine oil cooling system for aircraft comprising; means establishing a path of flow of said engine oil from the engine and back thereto, primary evaporative cooling means in said path vaporizing an evaporant in a heat exchange operation with said fluid, secondary cooling means coupled prior to and in series with said primary cooling means in said path, conduit means establishing a discharge path of flow for said evaporant vapor from the primary cooling means through the secondary cooling means whereby the cooling capacity of the system is increased, and pressure control means in said conduit means for regulating the pressure of the evaporant vapor.

4. An engine oil cooling system for aircraft comprising means establishing a path of flow of said engine oil in a closed circuit from the engine and back thereto, first, second and third heat transfer means serially connected in said path for flow of oil therethrough, means passing fuel for the engine through said first heat exchanger to cool the oil by heat transfer to the fuel, means supplying an expendable evaporant to said third heat exchanger to effect cooling of the oil by the heat of vaporization of said evaporant in changing into a vapor state in said third heat exchanger, and means passing the evaporant vapor from said third heat exchanger through said second heat exchanger in heat exchange relationship with the engine oil passing therethrough.

5. An engine oil cooling system for aircraft comprising means establishing a path of flow of said engine oil in a closed circuit from the engine and back thereto, first, second and third heat transfer means serially connected in said path for flow of oil therethrough, means passing fuel for the engine through said first heat exchanger to cool the oil by heat transfer to the fuel, means supplying an expendable evaporant to said third heat exchanger to effect cooling of the oil by the heat of vaporization of said evaporant in changing into a vapor state in said third heat exchanger, means passing the evaporant vapor from said third heat exchanger through said second heat exchanger in heat exchange relationship with the engine oil passing therethrough, and a thermostatic valve controlling a by-pass path for said engine oil around said third heat exchanger.

6. Engine oil cooling system for aircraft comprising means establishing a path of flow of said engine oil in a closed circuit from the engine and back thereto, first, second and third heat transfer means serially connected in said path for flow of oil therethrough, means passing fuel for the engine through said first heat exchanger to cool the oil by heat transfer to the fuel, means supplying an expendable evaporant to said third heat exchanger to effect cooling of the oil by the heat of vaporization of said evaporant in changing into a vapor state in said third heat exchanger, means passing the evaporant vapor from said third heat exchanger through said second heat exchanger in heat exchange relationship with the engine oil passing therethrough, and a pressure regulator controlling the pressure of the evaporant vapor to regulate the boiling temperature thereof within the third heat exchanger.

References Cited in the file of this patent

UNITED STATES PATENTS

| | | |
|---|---|---|
| 1,036,484 | Glass et al. | Aug. 20, 1912 |
| 1,893,228 | Copeman | Jan. 3, 1933 |
| 2,234,372 | Friedman | Mar. 11, 1941 |
| 2,261,418 | Schwarz | Nov. 4, 1941 |
| 2,480,693 | Aronson | Aug. 30, 1949 |
| 2,576,663 | Atchison | Nov. 27, 1951 |